_United States Patent_ [19]

Minorics et al.

[11] Patent Number: 5,435,093
[45] Date of Patent: Jul. 25, 1995

[54] FISHING JIG

[76] Inventors: Joseph J. Minorics, 805 Franklin Rd., Asbury, N.J. 08802; Ronald L. Roy, R.D. #1, Box 98, Washington, N.J. 07882

[21] Appl. No.: 228,089

[22] Filed: Apr. 15, 1994

[51] Int. Cl.⁶ .............................................. A01K 97/10
[52] U.S. Cl. .................................... 43/19.2; 43/21.2
[58] Field of Search ................. 43/19.2, 21.2, 54.1; D22/147; 248/512, 513, 518; 211/70.8; 114/364

[56] References Cited

U.S. PATENT DOCUMENTS

| | | | |
|---|---|---|---|
| 1,654,876 | 1/1928 | Hemming | 43/21.2 |
| 3,126,180 | 3/1964 | Mandolare | 43/21.2 |
| 3,772,816 | 11/1973 | Ridge | 43/21.2 |
| 4,157,803 | 6/1979 | Mack | 248/512 |
| 4,388,774 | 6/1983 | Thoemke | 43/21.2 |
| 4,527,349 | 7/1985 | Emory, Jr. | 248/513 |
| 4,581,840 | 4/1986 | Guith, II | 43/21.2 |
| 4,869,195 | 9/1989 | Eichfeld | 248/512 |
| 4,916,847 | 4/1990 | Rusgo | 43/19.2 |
| 5,086,580 | 2/1992 | Redding | 43/21.2 |

FOREIGN PATENT DOCUMENTS 487624  1/1976  U.S.S.R. ................. 43/21.2

Primary Examiner—Mark Rosenbaum
Assistant Examiner—Jeanne M. Elpel
Attorney, Agent, or Firm—Kenneth P. Glynn; Stephen J. Driscoll

[57] ABSTRACT

A device for jigging a multiplicity of fishing pole rods. The device includes a stanchion and a horizontal support member rotatably mounted to the stanchion. A multiplicity of rod holders for holding fishing rods radially extends from the support member. These rod holders have dimensions adequate to receive and support a fishing rod. The rod holders are jigged via a handle or a foot petal which is operatively connected to the support member. To prevent the support member from over-rotating and spilling the fishing rods, stops are provided on the support member and the stanchion. The device can be secured to a boat or land using a variety of mechanisms such as clamps, pegs, spikes or a stand.

19 Claims, 5 Drawing Sheets

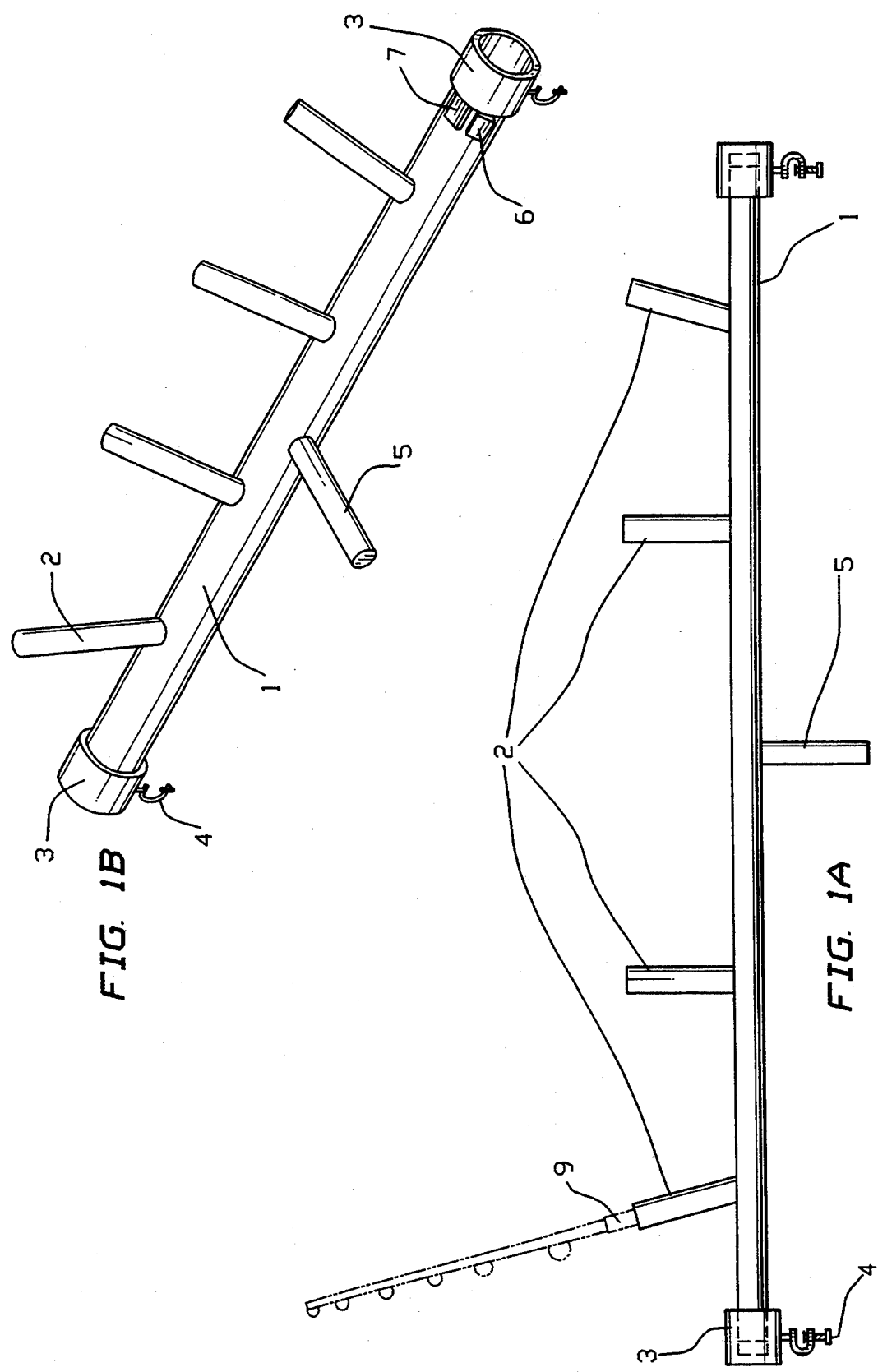

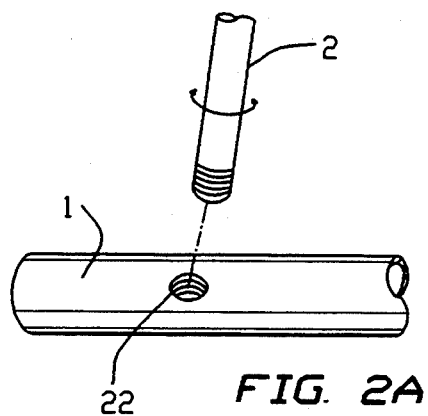
FIG. 2A
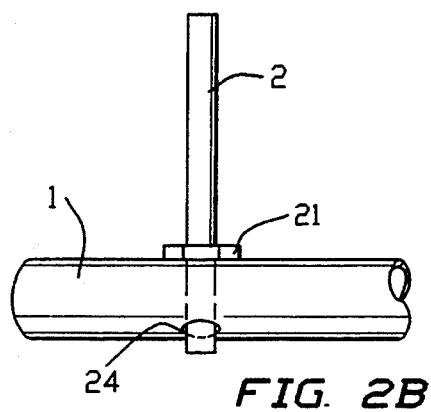
FIG. 2B
FIG. 3
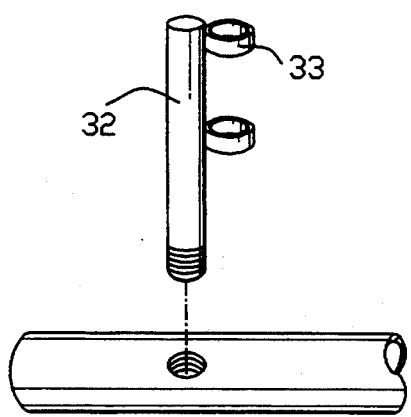
FIG. 4
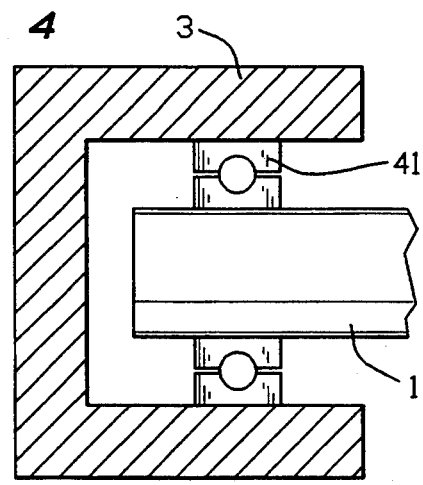
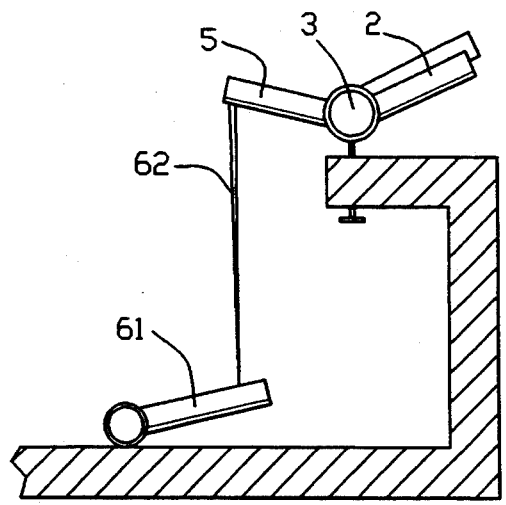
FIG. 6

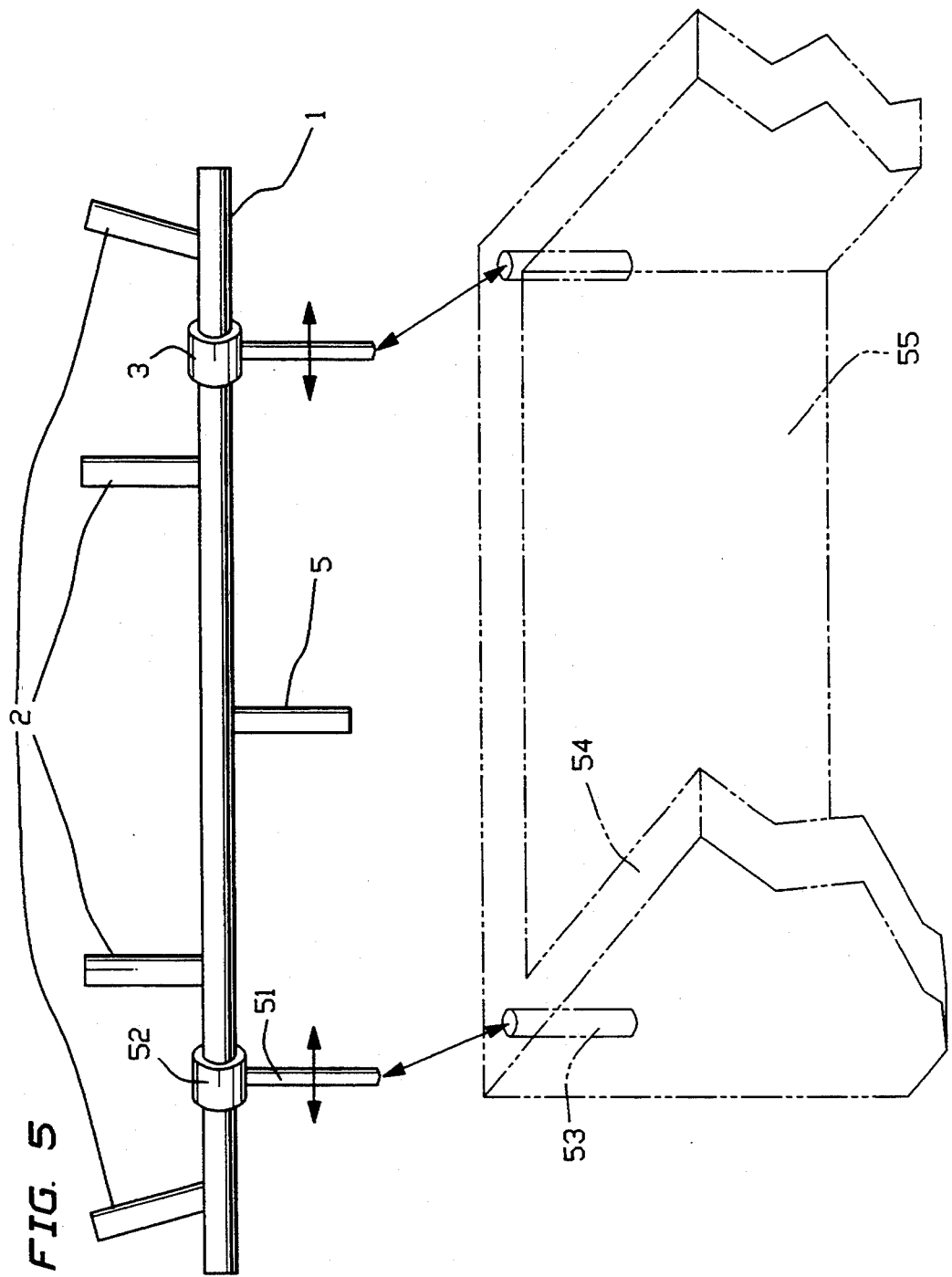

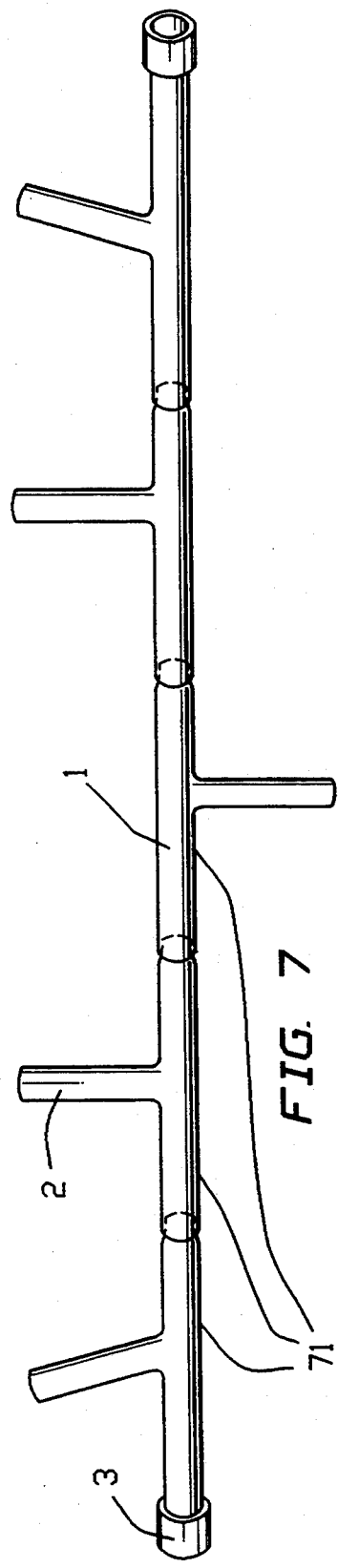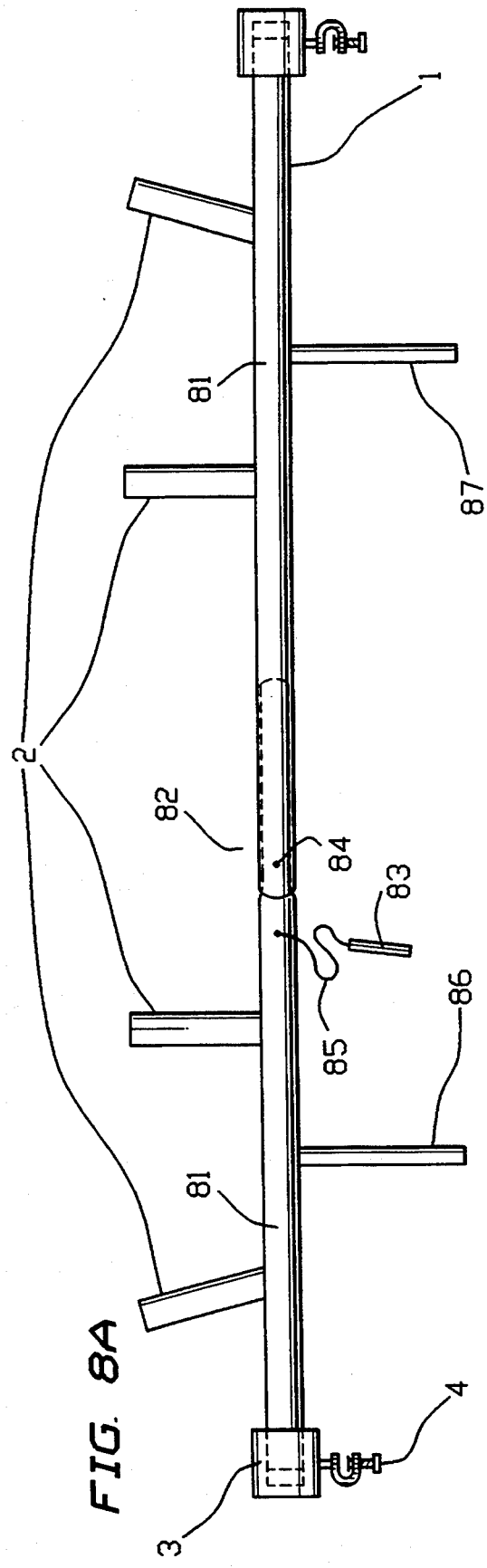

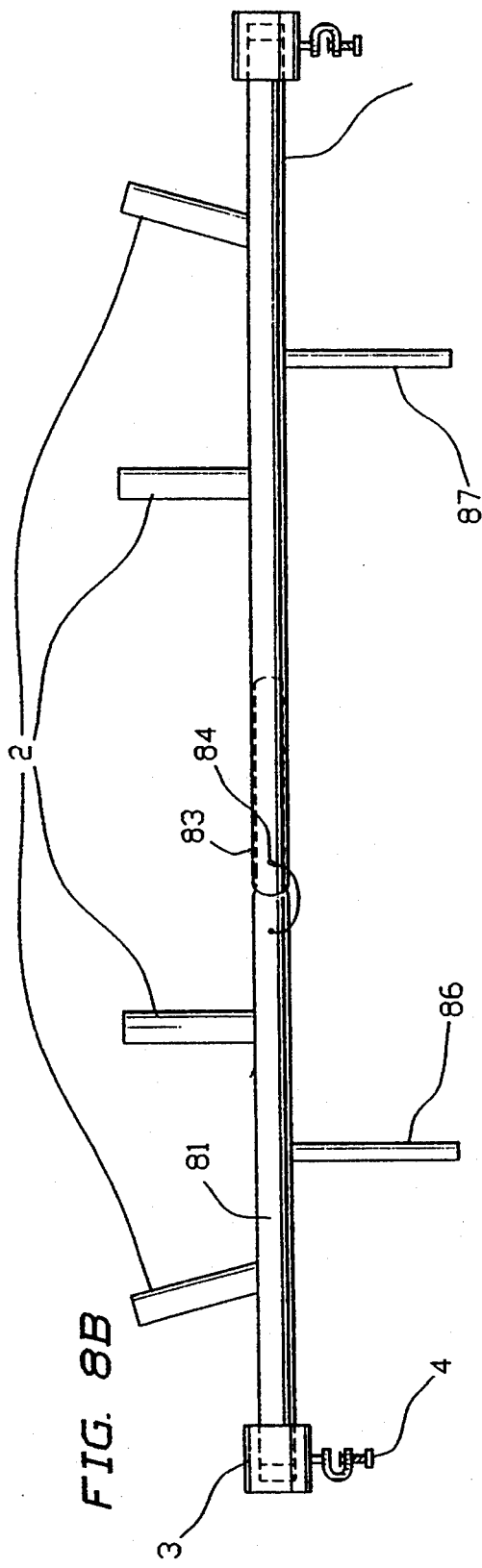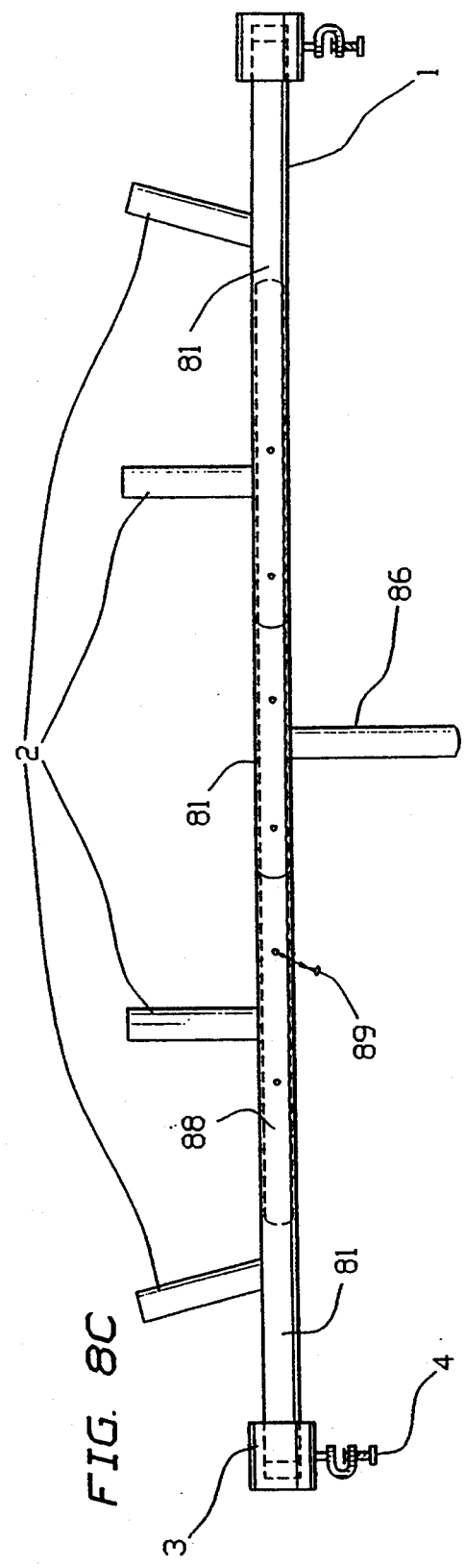

FISHING JIG

BACKGROUND OF THE INVENTION

1. Field of the Invention

The invention relates generally to a fishing device, and more specifically to a fishing device which holds and jigs a multiplicity of rods.

2. Information Disclosure Statement

Fishing is a recreational sport from many people as well as a profession for many others. Consequently, many devices have been developed to increase the ease and productivity of fishing. The prior art relevant to the present invention concerns those devices which hold multiple rods or facilitate jigging.

The prior art is rich in devices which hold fishing rods, and recently, several patents have issued that disclose holders for a multiplicity of poles. For example, Ridge, U.S. Pat. No. 3,772,816, discloses a fishing rod holder which may be attached to a boat for supporting a plurality of rods in a divergent relation. Mack, U.S. Pat. No. 4,157,803, also teaches a device which holds multiple rods and attaches to a boat. Mack also teaches clamping means to secure the fishing poles to the rod holders. Emory, Jr., U.S. Pat. No. 4,527,349 taches a device for trolling with multiple fishing rods. Unlike the other devices, Emory Jr. also discloses provisions for using downriggers. Each of these patents discloses a device which supports a multiplicity of fishing rods, however, none teach nor contain any motivation to jig these fishing rods.

To improve one's chances of catching certain types of fish, fisherman frequently apply a jigging action to the rod. This exercise can be strenuous, however, especially if continued for several hours as fisherman often do. Consequently, devices have been developed to ease the jigging process. For example, Guith II, U.S. Pat. No. 4,581,840, discloses a jigging device which is foot operated and can effectively jig a single rod. Furthermore, Redding, U.S. Pat. No. 5,086,580, teaches a fishing jigging apparatus which permits manual and selective oscillation of a fishing pole. None of the inventions disclosed, however, can jig a multiplicity of rods.

Therefore, the prior art neither offers neither a teaching nor motivation for jigging a multitude of fishing rods in an economical and effective manner, The present invention provides such capability,

SUMMARY OF THE INVENTION

The present invention is directed at a device for jigging a multiplicity of fishing pole rods. The device includes a stanchion and a horizontal support member rotatably mounted to the stanchion, A multiplicity of rod holders for holding fishing rods radially extends from the support member. These rod holders have dimensions adequate to receive and support a fishing rod. The rod holders are jigged via a handle or a foot petal which is operatively connected to the support member, To prevent the support member from over-rotating and spilling the fishing rods, stops are provided on the support member and the stanchion, The device can be secured to a boat or land using a variety of mechanisms such as clamps, pegs, spikes or a stand.

It is therefore a primary object of this invention to provide an inexpensive, ease to use, fishing rod holder.

It is a further object of this invention to provide a fisherman with the ability to jig more than one rod at a time.

It is still another object of the present invention to provide a fisherman to jig fishing rods with his foot.

It is yet another object of the present invention to provide a device which is easily transported, assembled, and disassembled.

Further objects, advantages and applications of the present invention will become apparent to those skilled in the art in view of the accompanying detailed description and drawings.

BRIEF DESCRIPTION OF THE DRAWINGS

The features of the present invention, which are believed to be novel, are set forth with particularity in the appended claims. The invention may best be understood by reference to the following description taken in conjunction with the accompanying drawings, wherein like reference numerals identify like elements, and wherein:

FIG. 1a shows a preferred embodiment of the present invention;

FIG. 1b shows a perspective view of the preferred embodiment of FIG. 1a;

FIG. 2a and 2b show different embodiments of the attachment of the rod holder and the support member;

FIG. 3 shows another preferred embodiment of the rod holder;

FIG. 4 shows an embodiment of the stanchion means;

FIG. 5 shows an alternative embodiment of the attaching means;

FIG. 6 shows an embodiment of the jigging means;

FIG. 7 shows another preferred embodiment of the present invention having sectional components; and, FIGS. 8a, 8b, and 8c show various preferred embodiments of the coupling.

DETAILED DESCRIPTION OF THE PRESENT INVENTION

The present invention is directed at a device for jigging a multiplicity of fishing rods for use on a boat or on shore. It can be manufactured from a variety of materials such as PVC tubing, aluminum, steel, and wood.

A schematic of the present invention is shown in FIG. 1. The device includes a main horizontal support member 1 which supports a multiplicity of rod holders 2. Rod holders 2 can be attached to support element 1 in a variety of ways. For example, in a more permanent assembly, rod holders 2 are welded or glued to supporting member 1. Alternatively, if a modular fishing jig is desired, rod holders 2 can be screwed into a threaded hole 22 or inserted through a hole 24 in support member 1 as shown in FIGS. 2a and 2b respectively. In the latter embodiment, a stopper 21 is used to prevent rod holders 2 from slipping through hole 24. Still another embodiment has rod holders 2 and support element 1 integrally formed as shown in FIG. 7. In the preferred embodiment of FIG. 1, rod holders 2 extend from support member 1 at diverging angles relative to each other. This serves to space apart rods 9 and thereby avoid tangled lines. Rod holders 2 could also extend from support member 1 at different radial positions relative to support member 1. This not only spaces apart the fishing lines but also balances the device to ease the jigging force required. It should be realized, however, that many methods of attaching rod holders 2 to support member 1 and combinations thereof are possible.

Rod holders 2 can have a variety of forms providing they have dimensions adequate to support a fishing rod. In FIG. 1, rod holders 2 are formed form a tube having a diameter wide enough to receive the handle of fishing rod 9 and a length long enough to support rod 9. As shown in FIG. 3, a rigid pole 32 with bands 33 could also be used wherein bands 33 are of adequate size to receive a rod 39 and rigid pole 32 is of adequate length and gauge to support a fishing rod.

Support member 1 is rotatably mounted in a stanchion 3. Stanchion 3 can assume a variety of forms depending upon the objective. For example, FIG. 1 depicts an inexpensive embodiment in which stanchion 3 is merely a cup-shaped housing that has an orifice large enough to receive support member 1. Another, more elaborate embodiment uses a bearing 41 (see FIG. 4), or a pillow block bearing to reduce friction as support member 1 rotates. Furthermore, stanchion 3 need not be located at the end of support member 1; stanchion 3 could comprise a sleeve 52 through which support member 1 passes as shown in FIG. 5.

Stanchion 3 is connected to attaching means as shown in FIG. 1. Attaching means in the embodiment of FIG. 1 comprises a C-clamp 4 which can attach to the gunwale of a boat or to a stationary object on shore such as a bench or a plank. Other attaching means include pegs 51 to fit into pre-existing rod holders on a boat (see FIG. 5), or stakes to be driven into the earth on shore. In FIG. 5, a device having pegs 51 and a sleeve-type stanchion 52 is shown. Pegs 51 can be moved along support member 1 to adjust for the space between the pre-existing rod holders 53 located on the gunwale 54 of a boat 55. Another embodiment of attaching means includes a free standing base connected to the stanchions. This base could be attached to a board or the like and the board in turn attached to the boat. Again, numerous embodiments of attaching means are possible depending upon the particular needs.

Support member 1 rotates in stanchions 3 via jigging means. Jigging means is operatively connected to support member 1 and can assume a variety of different configurations. In the embodiment of FIG. 1, jigging means comprises a handle 5. The operator merely moves handle 5 up and down to effect a jigging motion. Often a person may fish all day, and rocking support member 1 by hand may grow cumbersome. In such a case, jigging means can further comprise a foot petal 61 as shown in FIG. 6. This particular embodiment also comprises a linkage 62 that joins foot petal 61 with handle 5. Rather than linking foot petal 61 with handle 5, linkage 62 could link the foot petal with a particular rod handle 2. Another embodiment of the jigging means includes a motor either belted or directly coupled to support member 1.

To prevent support member 1 from over-rotating and spilling fishing rods 9, the device further comprises stopping means. The stopping means operatively connects to support member 1 and said stanchion 3. In the preferred embodiment of FIG. 1b, stopping means comprises a first stop 6 mounted on support member 1 and a second stop 7 operatively connected to said stanchion 3. First stop 6 and second stop 7 contact each other and prevent further rotation of the support member at a predetermined position. Other embodiments, of course, are possible. For example, first stop 6 could be rod holder 2, and second stop could be a board operatively connected to stanchion 3 (i.e., the board is attached to a boat, which in turn is attached to the attaching means, which in turn is attached to stanchion 3).

For convenience, it may be advantageous for the fishing jig to be modular in construction. To facilitate a modular design, the rod holders can be detachable as discussed above. Furthermore, the device may comprise sectional components 71 which releasibly connect together to form a modular assembly as depicted in FIG. 7. Support member 1 may comprise sectional components 71 or, as shown, sectional components 71 could be formed to include the rod holders as well. In one embodiment, sectional component 71 comprises various shapes of PVC tubing. Sectional components 71 can snap or snugly fit together which allows the fishing jig to be customized. That is, it can be assembled to have the desired number of rod holders or to span a required distance. These benefits are in addition to the ease of transportation inherent in a modular designed fishing rig.

Under certain laws and regulations, the number of poles operated by one person while fishing may be limited. To comply, the support member 1 can be split into portions 81 as shown in FIG. 8a. The embodiment of FIG. 8a comprises two portions 81 which are coupled through coupling 82, however, it should be understood that any number of portions is possible. In this embodiment, coupling 82 comprises pin 83, matching pin holes 84 on each portion 81, and a tether 85 to attach pin 83 to support member 1 to prevent its misplacement. FIG. 8a shows pin 83 removed from pin holes 84 thereby allowing the independent movement of portions 81. FIG. 8b shows the pin in place such that portions 81 can be jigged together. Note that each portion in FIGS. 7a and 7b includes independent jigging means, which, in this embodiment, comprises handles 86 and 87. FIG. 8c shows another coupling embodiment which comprises a long, internal sleeve 88 which axially runs along the interior of support member 1. Set screws 89 fasten each portion individually to interior sleeve 88. Interior sleeve 88 rotates according to the action of handle 86. In this way, only those portions which have set screws 89 in place and are essentially attached to interior sleeve 88 will respond to the jigging action.

Obviously, numerous modifications and variations of the present invention are possible in the light of the above teachings. It is therefore understood that within the scope of the appended claims, the invention may be practiced otherwise than as specifically described herein.

What is claimed is:

1. A device for jigging a multiplicity of fishing pole rods, said device comprises:
  a. a stanchion;
  b. a horizontal support member rotatably mounted to said stanchion;
  c. a multiplicity of rod holders for holding fishing rods, said rod holders radially extending from said support member and having dimensions adequate to receive and support a fishing rod;
  d. attaching means for securing the device to a sturdy foundation, said attaching means operatively attaching said stanchion to said sturdy foundation;
  e. jigging means for jigging said rod holders, said jigging means being operatively attached to said support member, said jigging means comprising:
    i. a handle which radially extends from said support member;
    ii. a foot pedal; and iii. a linkage which links said foot pedal to said handle to enable a user to jig the device with his foot;

f. stopping means for preventing said support member from over-rotating and spilling the fishing rods, said stopping means being operatively connected to said support member and said stanchion.

2. The device of claim 1 wherein said rod holders extend from said support member at diverging angles relative to each other such that the fishing rods are spaced apart to prevent tangles.

3. The device of claim 1 wherein said stanchion comprises a cup-shaped housing with an orifice large enough to receive an end of said support member.

4. The device of claim 1 wherein said stanchion comprises a bearing of adequate size to receive said support member.

5. The device of claim 1 wherein said handle is detachable from said support member.

6. The device of claim 1 wherein said handle comprises a rod holder.

7. The device of claim 1 wherein said attaching means comprises a peg being insertable into a pre-existing rod holder on a boat, said peg also being connected to said stanchion, wherein said stanchion comprises a sleeve slidably mounted to said support member such that said peg and sleeve is moveable along said support member to adjust for said pre-existing rod holder.

8. The device of claim 1 wherein said support member comprises at least two portions and a coupling, said coupling releasibly coupling said portions such that each portion moves independently when said coupling is broken.

9. A device for jigging a multiplicity of fishing pole rods, said device comprises:

a. a stanchion;

b. a horizontal support member being rotatably mounted to said stanchion, said support member comprising at least two portions and a coupling, said coupling being positioned between said portions and comprising an interior sleeve and set screws, said support member having holes to receive said set screws, when said coupling is engaged, said set screws are screwed through said support member and contact said interior sleeve such that said sleeve essentially couples said portions, when said coupling is broken, said set screws are positioned to avoid contacting said interior sleeve such that said portions move independently;

c. a multiplicity of rod holders for holding fishing rods, said rod holders radially extending from said support member and having dimensions adequate to receive and support a fishing rod;

d. attaching means for securing the device to a sturdy foundation, said attaching means operatively attaching said stanchion to said sturdy foundation;

e. jigging means for jigging said rod holders, said jigging means being operatively attached to said support member; and f. stopping means for preventing said support member from over-rotating and spilling the fishing rods, said stopping means being operatively connected to said support member and said stanchion.

10. The device of claim 9 wherein said jigging means are operatively connected to each portion such that said portions can be jigged independently.

11. The device of claim 9 wherein said rod holders extend from said support member at diverging angles relative to each other such that the fishing rods are spaced apart to prevent tangles.

12. The device of claim 9 wherein said handle is detachable from said support member.

13. The device of claim 9 wherein said handle comprises a rod holder.

14. The device of claim 9 wherein said attaching means comprises a peg being insertable into a pre-existing rod holder on a boat, said peg also being connected to said stanchion, wherein said stanchion comprises a sleeve slidably mounted to said support member such that said peg and sleeve is moveable along said support member to adjust for the position of said pre-existing rod holder.

15. A device for jigging a multiplicity of fishing pole rods, said device comprises:

a. a stanchion;

b. a horizontal support member being rotatably mounted to said stanchion;

c. a multiplicity of rod holders for holding fishing rods, said rod holders radially extending from said support member and having dimensions adequate to receive and support a fishing rod;

d. attaching means for securing the device to a sturdy foundation, said attaching means operatively attaching said stanchion to said sturdy foundation;

e. jigging means for jigging said rod holders, said jigging means being operatively attached to said support member; and f. stopping means for preventing said support member from over-rotating and spilling the fishing rods, said stopping means comprising a first stop on said support member and a second stop operatively connected to said stanchion, said first and second stop contacting each other and preventing further rotation of said support member at a predetermined position.

16. The device of claim 15 wherein-said rod holders extend from said support member at diverging angles relative to each other such that the fishing rods are spaced apart to prevent tangles.

17. The device of claim 15 wherein said support member has a detachable handle.

18. The device of claim 15 wherein said support member has a handle comprising a rod holder.

19. The device of claim 15 wherein said attaching means comprises a peg being insertable into a pre-existing rod holder on a boat, said peg also being connected to said stanchion, wherein said stanchion comprises a sleeve slidably mounted to said support member such that said peg and sleeve is moveable along said support member to adjust for the position of said pre-existing rod holder.

* * * * *